(12) United States Patent
Stojkovic et al.

(10) Patent No.: US 8,491,042 B2
(45) Date of Patent: Jul. 23, 2013

(54) ENERGY-ABSORBING COWL STRUCTURE

(75) Inventors: Dragan Stojkovic, Southgate, MI (US);
Sudip Sankar Bhattacharjee, Lasalle (CA); Chang Hun Lee, Rochester, MI (US); Robert W. Hasse, Dearborn, MI (US)

(73) Assignee: Ford Global technologies, LLC, Dearborn, MI (US)

( * ) Notice: Subject to any disclaimer, the term of this patent is extended or adjusted under 35 U.S.C. 154(b) by 128 days.

(21) Appl. No.: 12/876,527

(22) Filed: Sep. 7, 2010

(65) Prior Publication Data

US 2012/0056446 A1   Mar. 8, 2012

(51) Int. Cl.
*B60J 1/02* (2006.01)

(52) U.S. Cl.
USPC ............................................ 296/192

(58) Field of Classification Search
USPC ............... 296/187.04, 192, 200, 201, 96.21
See application file for complete search history.

(56) References Cited

U.S. PATENT DOCUMENTS

| 4,718,713 | A  | * | 1/1988  | Sakamoto et al. | 296/192    |
| 4,976,491 | A  | * | 12/1990 | Hashimoto et al.| 296/192    |
| 5,934,743 | A  |   | 8/1999  | Nohr            | 296/187.06 |
| 6,193,304 | B1 | * | 2/2001  | Takahashi et al.| 296/192    |
| 6,193,305 | B1 | * | 2/2001  | Takahashi       | 296/192    |
| 6,565,148 | B1 | * | 5/2003  | Teramoto et al. | 296/192    |
| 6,682,131 | B2 | * | 1/2004  | Hayashi         | 296/192    |
| 7,004,534 | B2 |   | 2/2006  | Yoshii          | 296/192    |
| 7,182,397 | B1 | * | 2/2007  | Desai           | 296/192    |
| 7,357,446 | B2 |   | 4/2008  | Sakai           | 296/192    |
| 7,404,596 | B2 |   | 7/2008  | Miyata          | 296/203.02 |
| 7,946,645 | B2 | * | 5/2011  | Yano            | 296/192    |
| 7,967,097 | B2 | * | 6/2011  | Ore             | 180/227    |
| 7,988,223 | B2 | * | 8/2011  | Nakajima et al. | 296/192    |
| 8,136,870 | B2 | * | 3/2012  | Ott et al.      | 296/192    |
| 8,152,227 | B2 | * | 4/2012  | Kurata et al.   | 296/192    |
| 8,186,749 | B2 | * | 5/2012  | Serizawa et al. | 296/192    |
| 2003/0107243 | A1 | * | 6/2003 | Hayashi         | 296/192    |
| 2003/0159875 | A1 | * | 8/2003 | Sato et al.     | 180/274    |
| 2003/0178873 | A1 | * | 9/2003 | Kato et al.     | 296/192    |
| 2005/0179285 | A1 | * | 8/2005 | Nakajima et al. | 296/192    |
| 2006/0087155 | A1 | * | 4/2006 | Koyama et al.   | 296/192    |
| 2006/0186704 | A1 | * | 8/2006 | Sakai et al.    | 296/192    |
| 2009/0146459 | A1 | * | 6/2009 | Watanabe et al. | 296/192    |
| 2009/0206633 | A1 | * | 8/2009 | Feeser et al.   | 296/198    |
| 2009/0261621 | A1 | * | 10/2009 | Usuda          | 296/192    |
| 2011/0049933 | A1 | * | 3/2011 | Serizawa et al. | 296/192    |
| 2011/0068607 | A1 | * | 3/2011 | Ott et al.      | 296/192    |
| 2012/0056446 | A1 | * | 3/2012 | Stojkovic et al.| 296/192    |

FOREIGN PATENT DOCUMENTS

| JP | 2006219031 | * | 8/2006 |
| JP | 2009137483 | * | 6/2009 |

(Continued)

OTHER PUBLICATIONS

Pedestrian Measures for the Opel Zafira II, Thomas Wanke, 2005.

*Primary Examiner* — Glenn Dayoan
*Assistant Examiner* — Gregory Blankenship
(74) *Attorney, Agent, or Firm* — L.C. Begin & Associates, PLLC

(57) ABSTRACT

An energy-absorbing cowl structure for a vehicle is provided. The structure includes a first portion and a curved second portion extending from the first portion. A length of the first portion varies along a dimension of the cowl structure.

21 Claims, 4 Drawing Sheets

FOREIGN PATENT DOCUMENTS

| | | | |
|---|---|---|---|
| JP | 2009208663 | * | 9/2009 |
| JP | 2009-274622 | * | 11/2009 |
| JP | 2009286322 A | | 12/2009 |
| JP | 2011084097 | * | 4/2011 |

* cited by examiner

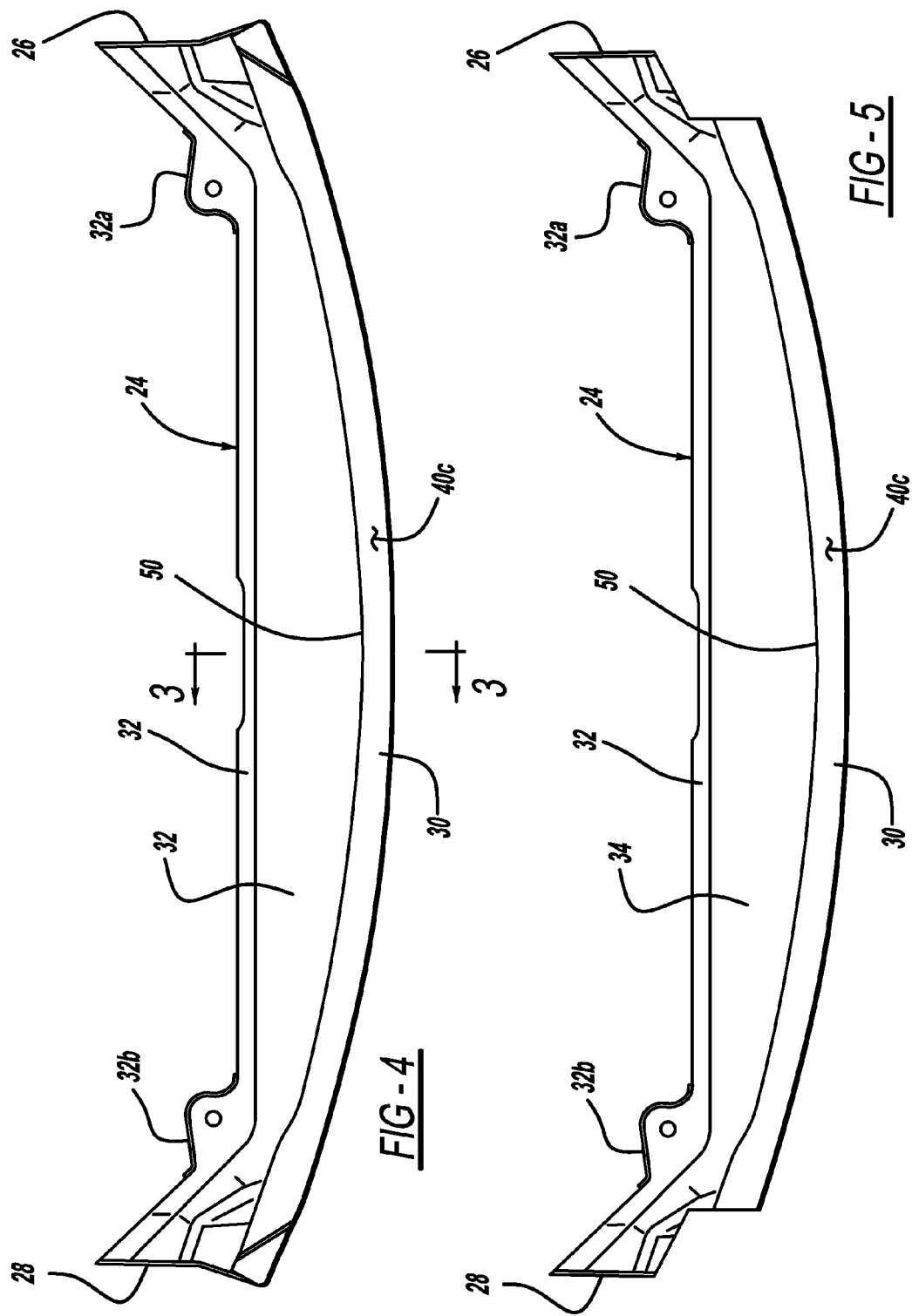

ENERGY-ABSORBING COWL STRUCTURE

BACKGROUND OF THE INVENTION

The embodiments of the present invention generally relate to motor vehicles and, more particularly, to a front body structure of a motor vehicle designed to absorb energy resulting from impact of a pedestrian contacting the vehicle, in a manner that minimizes injury to the pedestrian.

Programs such as European New Car Assessment Program (Euro NCAP) propound vehicle design guidelines and criteria directed to minimizing the severity of injuries to pedestrians impacting portions of the vehicle. For example, the HIC (Head Injury Criterion) relates to impact of a human head against the windshield, hood, and other portions of the vehicle. From a technical perspective, design of vehicle elements for injury mitigation involves various mechanisms for absorbing the energy generated by impact of the pedestrian with a portion of the vehicle so as to minimize the deceleration of the pedestrian. This may involve the design of vehicle component so as to deflect or deform under impact loads, and the provision of sufficient space for the portion of the vehicle to deform or deflect during impact. Thus, there is a need for an energy-absorbing vehicle front body structure to which a portion of a windshield may be mounted.

SUMMARY OF THE INVENTION

In one aspect of the embodiments of the present invention, a cowl structure for a vehicle is provided. The structure includes a first portion and a curved second portion extending from the first portion. A length of the first portion varies along a dimension of the cowl structure.

In another aspect of the embodiments of the present invention, a cowl structure for a vehicle is provided. The structure includes a base portion, a first portion extending from the base portion, a curved second portion extending from the first portion, and a third portion extending from the second portion, The first portion is resiliently deflectable with respect to the base portion responsive to a force applied to the third portion.

In another aspect of the embodiments of the present invention, a cowl structure for a vehicle is provided. The structure includes a first portion coupled to a portion of the vehicle and a curved second portion extending from the first portion. A third portion extends from the second portion and is configured for attaching a windshield thereto, for supporting the windshield against a force applied to the windshield.

BRIEF DESCRIPTION OF THE DRAWINGS

In the drawings illustrating embodiments of the present invention:

FIG. 4 is a plan view of a cowl structure in accordance with one embodiment of the present invention.

FIG. 5 is a plan view of a cowl structure in accordance with an alternative embodiment of the present invention.

DETAILED DESCRIPTION

Figure 1:
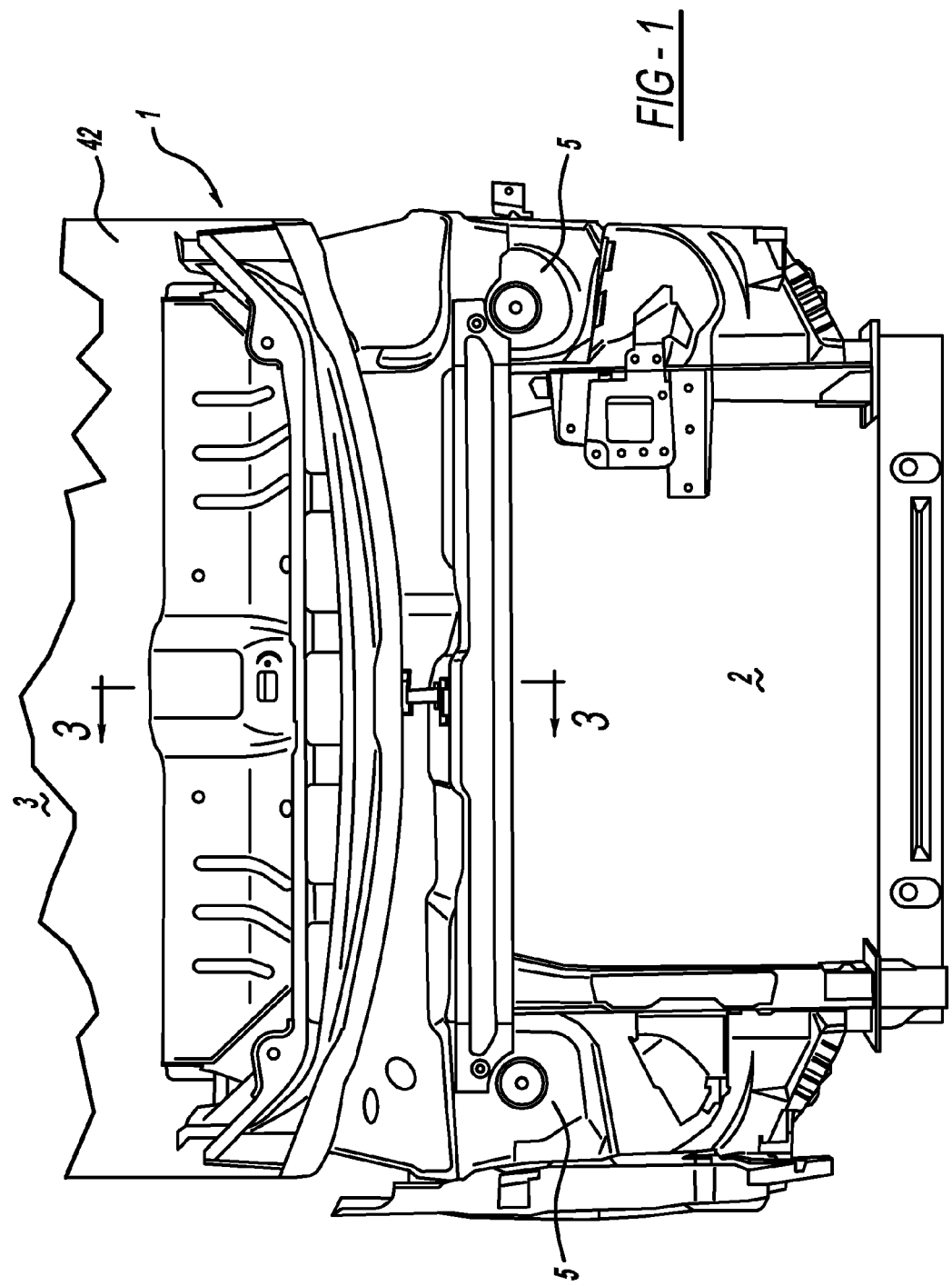
FIG. 1 is a top plan view of a front body construction of a motor vehicle, in accordance with an embodiment of the present invention.

Before the description of the present invention proceeds, it is to be noted that like parts are designated by like reference numerals throughout the several views of the accompanying drawings.

Referring now to the drawings, FIGS. 1-4 show a portion of a front body construction of a motor vehicle according to one embodiment of the present invention. In FIGS. 1-4, reference numeral 1 denotes a vehicle body 1 of the motor vehicle. An engine compartment 2 is formed at a front portion of the vehicle body 1, while a cabin 3 is formed rearwards of the engine compartment 2. The engine compartment 2 and the cabin 3 are separated from each other in a longitudinal direction of the vehicle body 1 by a lower dash panel 22. As shown in FIG. 1, a pair of suspension pillars or towers 5 are provided at opposite sides of the engine compartment 2 at positions spaced in a lateral direction of the vehicle body 1. An engine body and other vehicle components mounted under the vehicle hood are provided between the suspension towers 5 in a known manner.

Referring to FIGS. 1-4, an upper dash panel 20 is attached to lower dash panel 22 and extends substantially horizontally from the lower dash panel. A cowl 24 is attached to lower dash panel 22 using welding or any other suitable means. Cowl 24 has a pair of opposite end portions 26 and 28 and a central portion 30 coupled to end portions 26 and 28 between the end portions. As seen in FIGS. 1-4, the cowl 24 forms a curved structure substantially parallel with a horizontal plane such that at least one of the opposite end portions 26 and 28 of the cowl is disposed rearwards of the central portion 30 of the cowl in the longitudinal direction of the vehicle body. Cowl 24 may be formed from a metallic material, a polymer material, or any other suitable material or combination of materials.

Figure 2:
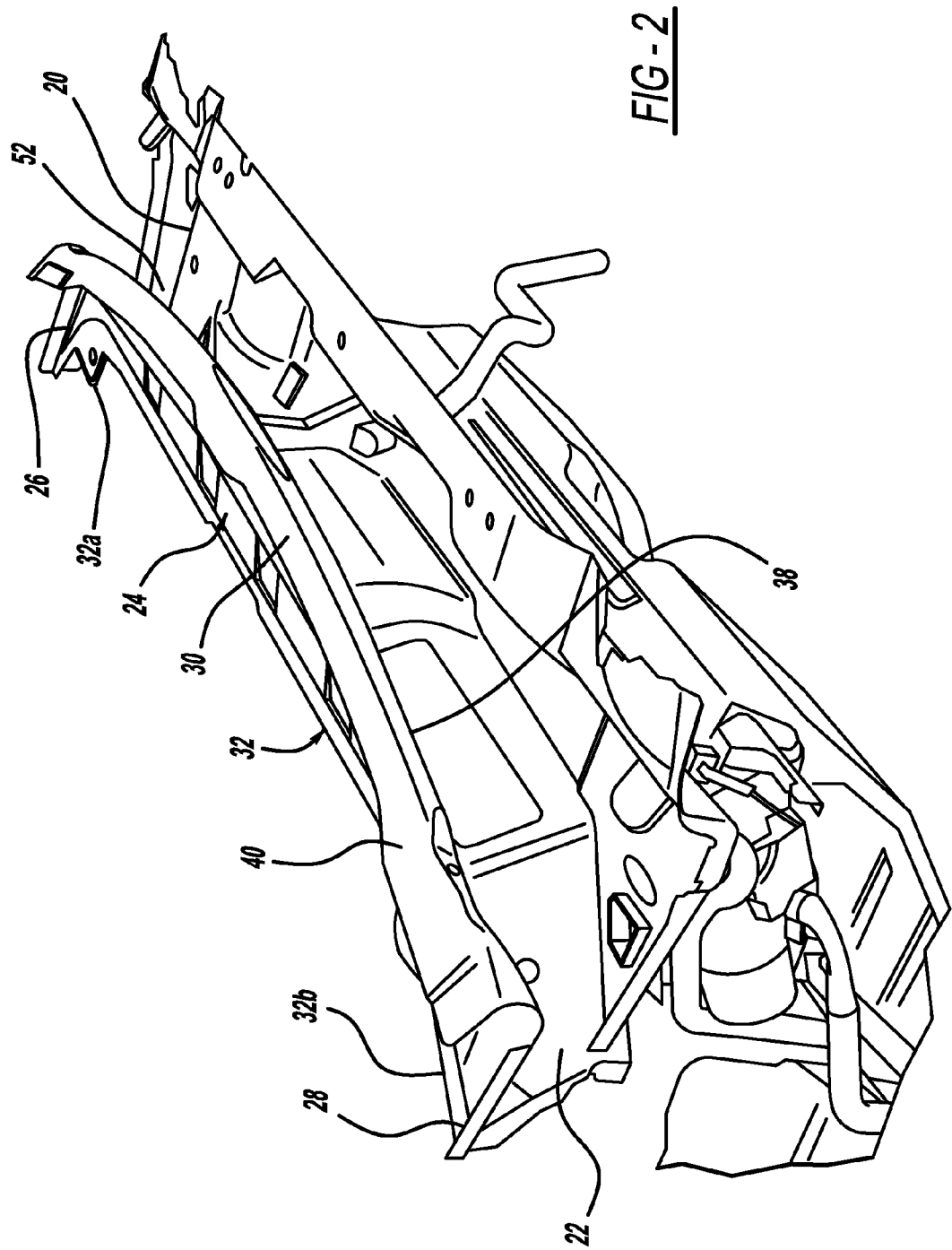
FIG. 2 is a perspective view of a cowl structure in accordance with an embodiment of the present invention attached to dash panels of a vehicle.
Figure 3:
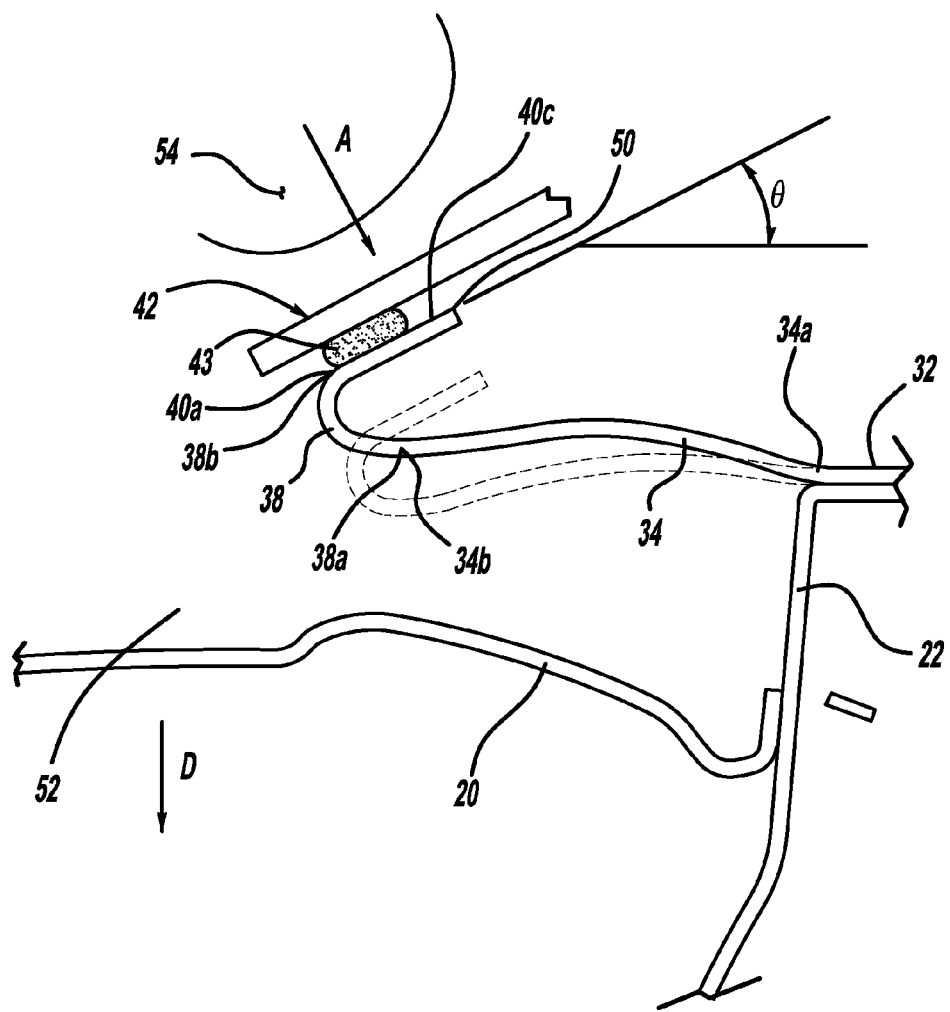
FIG. 3 is a cross-sectional view of a central portion of the cowl structure shown in FIG. 2, showing a portion of the cowl structure in a non-deflected state and in one possible embodiment of a deflected state.

FIG. 3 shows a cross-section of the cowl 24 taken through cowl central portion 30. Referring to FIGS. 2 and 3, cowl 24 also has a base portion 32 configured for attachment to lower dash panel 22 by welding or any other suitable means. Base portion 32 may have opposed ends 32a and 32b (forming portions of opposed cowl end portions 26 and 28) which are configured for securement to other structural elements of the vehicle, by welding, for example. A first cowl portion 34 extends from base portion 32 in a first general direction away from lower dash panel 22. In the embodiment shown in FIGS. 2 and 3, first portion 34 extends from the base portion 32 toward a forwardmost portion of the vehicle. Also, in the embodiment shown in FIG. 3, first portion 34 extends substantially horizontally with respect to lower dash panel 22. However, the first portion 34 may be configured to form any desired angle with respect to lower dash panel 22 or cowl base portion 32, depending on the requirements of a particular application.

In the particular embodiment shown in FIGS. 1-4, the length of first portion 34 (parallel to a longitudinal axis of the vehicle) varies along the lateral extent or dimension of cowl 24. Thus, in a cowl having a substantially uniform material thickness along the lateral extent of the part, the length of first portion 34 increases in a direction toward the center of the lateral dimension. Thus, the stiffness of the cowl may decrease toward the center of the part along the lateral extent, and the stiffness may increase toward the ends of the part. Therefore, the cowl may exhibit relatively greater compliance to a load applied to third portion 40 (described below) at or proximate the lateral center of the part. If it is desired to maintain the variation in the length of first portion 34 while substantially equalizing the cowl stiffness along the lateral extent of the cowl, stiffening features such as ribs may be included in the cowl geometry.

A curved second portion 38 extends from an end 34*b* of first portion 34. Second portion 38 curves generally upwardly from first portion end 34*b* to an end 38*b* of the second portion. Second portion 38 may have a substantially constant radius of curvature R, or the radius of curvature may vary along the length of the second portion, depending on the requirements of a particular application. In a particular embodiment, the radius of the second portion 38 is larger proximate ends 32*a* and 32*b* of the cowl. The curved portion 38 may extend for any desired arc length, depending on such factors as the angle between first portion 34 and second portion 38 at a junction between them, the angle at which the windshield 42 is mounted with respect to a horizontal plane, and other pertinent factors. In one embodiment, the radius R is in the range of about 16 millimeters to about 20 millimeters. In a particular embodiment, the radius at and/or proximate the lateral center of the cowl is circular. In a particular embodiment, the radius at and/or proximate the lateral center of the cowl is about 16 millimeters. However, the radius may have any suitable value.

In the embodiment shown in FIGS. 1-4, a third portion 40 extends from end 38*b* of second portion 38. In the embodiment shown in FIG. 3, third portion 40 is substantially straight; however, the third portion may have any desired cross-sectional shape. In a particular embodiment, third portion 40 forms an angle θ with a horizontal plane. An outwardly and upwardly facing surface 40*c* of third portion 40 is configured for attaching a lower portion of windshield 42 thereto for supporting the windshield against a force applied to the windshield, as shown in FIG. 3. The lower portion of windshield 42 may be attached to the cowl upper surface 40*c* using an adhesive, a sealing member 43, or other suitable means. The desired angle θ may depend on the angle that the windshield makes with horizontal plane.

In the embodiment shown in FIG. 2, cowl end portions 26 and 28 are welded or otherwise suitably attached to respective ones of opposite vehicle frame side portions (not shown in FIG. 2) at 28*a* and at 26*a* (not shown in FIG. 2). Also, the cowl is welded or otherwise suitably attached to the vehicle frame side portions and/or to respective opposite A-pillars (also not shown in FIG. 2) at respective ends of cowl upper surface 40*c*. The attachments of cowl end portions 26 and 28 to the vehicle body, the cowl structure connecting the cowl central portion 30 with the cowl end portions 26 and 28, and the structure of cowl central portion 30 are all configured to permit deflection of cowl central portion 30 responsive to a force exerted on a windshield bonded to the cowl. To absorb the energy of an impact on windshield 42, the cowl central portion 30 shown in FIG. 3 is configured to deflect multi-modally responsive to application of a force to the windshield attached thereto. That is, each of the first, second, and third portions 34, 38 and 40 can deflect or deform responsive to the applied loading, thus providing several possible modes of deflection.

When a force "A" is applied to the windshield (due to impact by a pedestrian, for example), the force is transferred to third portion 40. Cowl third portion 40 moves in the general direction of application of the force, thereby forcing first and second portions 34 and 38 generally downward, in the direction indicated by arrow "D". Depending upon the amount by which third portion 40 moves, movement of third portion 40 may cause a rotation of third portion free end 50 with respect to a third portion end 40*a* extending from second portion end 38*b*, and also with respect to second portion end 38*b* to which third portion 40 is attached. In this respect, third portion 40 is capable of absorbing impact energy by deforming responsive to the applied load. Movement of third portion 40 may also cause second portion end 38*b* to deflect or coil inward with respect to second portion end 38*a* and with respect to first end portion 34*b*, to which the second portion 38 is attached. Movement of second portion 38 downward may also cause second portion end 38*a* to deflect or coil inward with respect to second portion end 38*b*. In these respects, second portion 38 is capable of absorbing impact energy by deforming responsive to the applied load. At the same time, the first portion end 34*b* rotationally deflects with respect to base portion 32 and the portion of the vehicle to which the base portion is attached, responsive to a component of the applied force "A" transmitted through the cowl second portion 36 to first portion end 34*b*. In this respect, first portion 34 absorbs impact energy by deforming responsive to the applied load. Thus, the first, second, and third portions effectively act as spring portions for absorbing at least a portion of the impact energy. In a particular embodiment, first portion 34 is resiliently deflectable with respect to base portion 32 responsive to the force applied to the third portion 40. Also, in a particular embodiment, second portion is resiliently deflectable responsive to the applied force. Also, in a particular embodiment, the third portion is resiliently deflectable with respect to the second portion responsive to the applied force.

The cross-sectional configuration just described is designed to maximize energy absorption per unit deflection of the cowl central portion 30, thereby optimizing use of the limited space available to accommodate deflection of the cowl central portion 30. This configuration is also directed to maximizing the amount the cross-section can deflect prior to plastic deformation of the cross-section and/or failure of the cowl material. This aids in reducing the deceleration rate of an object impacting the windshield.

In the particular embodiment shown in FIGS. 1-4, the structure of the cowl central portion 30 just described extends the entire length of the cowl along a lateral (i.e., side-to-side) axis of the vehicle. In this embodiment, ends of the cowl third portion 40 (and, optionally, ends of the cowl first and/or second portions 34 and 38, respectively) are attached (using welding or any other suitable means) to respective portions of the vehicle body (for example, the vehicle "A" pillars). Constraining the ends of the cowl in this manner may correspondingly restrict the amount of deflectability of cowl central portion 30 responsive to a force exerted on the windshield.

Referring to FIG. 5, in another embodiment, the structure of the cowl central portion 30 described above does not extend the entire length of the cowl along a lateral axis of the vehicle. Rather, the central portion structure terminates proximate but spaced apart from the actual ends 26 and 28 of the cowl, and the lateral ends of one or more of the cowl first portion 34, second portion 38, and/or third portion 40 are not directly attached to portions of the vehicle body. Thus, the cowl central portion 30 effectively becomes a cantilevered structure extending from base portion 32. As the ends of the cowl central portion 30 are not constrained as previously described, these ends do not restrict the deflection of the cowl central portion connected to the ends. Thus, this arrangement may permit a greater degree of deflection or compliance of the cowl central portion 30 responsive to a force applied to the windshield. The diminished relative stiffness of the cowl central portion 30 resulting from lack of direct attachment to the vehicle pillars may also be compensated for to some degree by additional modifications to the structure of the cowl central portion, if desired. For example, stiffening ribs (not shown) may be provided at certain locations along the length of the cowl central portion 30.

Other factors such as the thicknesses of the cowl cross-section along the lengths of the first, second, and third cowl portions, the radius (or radii) of curvature of cowl second portion 38, the lengths of cowl first and third portions 34 and 38, the material from which the cowl is fabricated and other pertinent parameters may also be varied to adjust the force-deflection response of the cowl central portion to the requirements of a particular application. However, in all embodiments described herein, such elements as the structure of the cowl, the method of attaching the lower portion of the windshield to the cowl and other pertinent features are specified such that the lower portion of the windshield remains attached to the cowl even when the cowl is in a deformed or deflected state.

In a particular embodiment, the cross section of the cowl central portion 30 is tapered from a relatively thicker section T1 at or proximate base portion 32 down to a relatively thinner section T2 at some location along the cross section between the base portion and a free end 50 of third portion 40 (for example, at or proximate an end 38b of curved second portion 38). It is believed that this tapering of the cross-section permits more efficient use of the cowl material with regard to energy-absorption.

Referring again to FIG. 3, a plenum or cavity 52 is formed in engine compartment 2. The cavity is defined by lower dash panel 22, upper dash panel 20, and cowl 24. The cavity 52 provides a space into which cowl central portion 30 deflects in response to a force applied to windshield 42, which is attached to the cowl. When an object 54 impacts windshield 42, cowl central portion 30 deflects multi-modally as shown in FIG. 3, absorbing at least a portion of the impact energy. In one particular embodiment, one or more of cowl first, second, and third portions 34, 38, and 40 are designed to be resiliently deflectable and to elastically deform responsive to application of a force on the windshield. In this embodiment, the resiliently deflectable cowl portion (or portions) returns to an undeflected state upon removal of the applied force. In another particular embodiment, one or more of cowl first, second, and third portions 34, 38, and 40 may plastically deform responsive to application of the force on the windshield. In this embodiment, the central portion 30 may not completely return to its previous undeflected state upon removal of the applied force.

In a particular embodiment, one or more hard stop surfaces (not shown) may be provided in the path of deflection of the cowl central portion 30, in order to limit the deflection of one or more portions of the central portion to a predetermined maximum amount.

In a particular embodiment, the third cowl portion 40 is omitted and the lower portion of the windshield is attached to the cowl second portion 38. This embodiment may be configured so that the first and second cowl portions form a cantilevered structure, in the manner previously described.

In other embodiments, the structure of the cowl central portion 24 may be configured to include additional, independently resiliently deflectable spring sections, depending on such factors as available space and the energy absorption requirements of a particular application.

As well as being independently attachable to the body of a vehicle, a cowl in accordance with an embodiment of the present invention may also be incorporated into a sub-assembly which is attached to the vehicle.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A cowl structure for a vehicle comprising:
a first portion extending in a first direction; and
a curved second portion extending from the first portion,
a third portion extending from the second portion in a second direction generally opposite the first direction and terminating in a free end, wherein a cross-section of the cowl structure is hook-shaped.

2. The cowl structure of claim 1 wherein the third portion is structured for mounting a windshield thereto, and wherein the third portion is structured to deflect responsive to a force exerted on the windshield when the windshield is mounted thereto.

3. A motor vehicle including a cowl structure comprising:
a first portion extending in a first direction; and
a curved second portion extending from the first portion,
a third portion extending from the second portion in a second direction generally opposite the first direction and terminating in a free end,
wherein the cowl structure second portion includes a pair of opposite lateral ends, and wherein the lateral ends are not directly attached to the vehicle.

4. A motor vehicle including a cowl structure in accordance with claim 1.

5. A vehicle sub-assembly including a cowl structure in accordance with claim 1.

6. The cowl structure of claim 1 further comprising a base portion extending from the first portion and configured for attachment to the vehicle.

7. A motor vehicle including a cowl structure comprising:
a first portion extending in a first direction; and
a curved second portion extending from the first portion,
a third portion extending from the second portion in a second direction generally opposite the first direction and terminating in a free end,
wherein the cowl structure third portion includes a pair of opposite lateral ends, and wherein the lateral ends are not directly attached to the vehicle.

8. A cowl structure for a vehicle comprising:
a base portion;
a first portion extending from the base portion;
a curved second portion extending from the first portion; and
a third portion extending from the second portion,
wherein the first portion is resiliently deflectable with respect to the base portion responsive to a force applied to the third portion,
and wherein the base portion is structured to be directly attached to a portion of the vehicle, wherein the second portion includes a pair of opposite lateral ends, and wherein the lateral ends are structured so as to not be directly attached to the vehicle when the base portion is directly attached to the portion of the vehicle.

9. The cowl structure of claim 8 wherein the second portion is resiliently deflectable responsive to the applied force.

10. A motor vehicle including a cowl structure in accordance with claim 8.

11. The motor vehicle of claim 10 further comprising a windshield attached to the cowl structure third portion and wherein the third portion is structured to deflect responsive to a force exerted on the windshield.

12. The motor vehicle of claim 10 wherein the third portion is resiliently deflectable with respect to the second portion responsive to the applied force.

13. A vehicle sub-assembly including a cowl structure in accordance with claim 8.

14. A cowl structure for a vehicle comprising:
- a base portion structured to be directly attachable to a portion of a vehicle located vertically beneath a windshield of the vehicle;
- a first portion extending from the base portion;
- a curved second portion extending from the first portion; and
- a third portion extending from the second portion, the third portion including a surface configured for attaching a windshield thereto.

15. A motor vehicle including a cowl structure in accordance with claim 14.

16. A vehicle sub-assembly including a cowl structure in accordance with claim 14.

17. The cowl structure of claim 14 wherein the second portion is deflectable with respect to the first portion responsive to application of the force to the second portion.

18. The motor vehicle of claim 15 further comprising a windshield attached to the cowl structure third portion surface.

19. The vehicle of claim 14 wherein the second portion includes a pair of opposite lateral ends, and wherein the lateral ends are structured so as to not be directly attached to the vehicle when the base portion is directly attached to the portion of the vehicle.

20. The vehicle of claim 14 wherein the third portion includes a pair of opposite lateral ends, and wherein the lateral ends are structured so as to not be directly attached to the vehicle when the base portion is directly attached to the portion of the vehicle.

21. A cowl structure for a vehicle comprising:
- a base portion;
- a first portion extending from the base portion;
- a curved second portion extending from the first portion; and
- a third portion extending from the second portion,
- wherein the first portion is resiliently deflectable with respect to the base portion responsive to a force applied to the third portion,
- and wherein the base portion is structured to be directly attached to a portion of the vehicle, wherein the third portion includes a pair of opposite lateral ends, and wherein the lateral ends are structured so as to not be directly attached to the vehicle when the base portion is directly attached to the portion of the vehicle.

* * * * *